(12) United States Patent
Makino et al.

(10) Patent No.: US 11,541,767 B2
(45) Date of Patent: Jan. 3, 2023

(54) VEHICLE POWER SUPPLY

(71) Applicant: SUBARU CORPORATION, Tokyo (JP)

(72) Inventors: Kazuki Makino, Tokyo (JP); Itaru Seta, Tokyo (JP); Yosuke Ohtomo, Tokyo (JP); Hiroyuki Suzuki, Tokyo (JP); Takashi Kono, Tokyo (JP); Shinya Sagawa, Tokyo (JP); Masaki Komuro, Tokyo (JP); Masakazu Yoshino, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/411,956

(22) Filed: Aug. 25, 2021

(65) Prior Publication Data

US 2022/0089051 A1 Mar. 24, 2022

(30) Foreign Application Priority Data

Sep. 24, 2020 (JP) .............................. JP2020-159233

(51) Int. Cl.
*B60L 53/24* (2019.01)
*H01M 10/48* (2006.01)
(Continued)

(52) U.S. Cl.
CPC .............. *B60L 53/24* (2019.02); *B60L 50/66* (2019.02); *B60L 58/12* (2019.02);
(Continued)

(58) Field of Classification Search
CPC .......... B60L 53/24; B60L 50/66; B60L 58/12; B60L 2240/36; H01M 10/425;
(Continued)

(56) References Cited

U.S. PATENT DOCUMENTS 8,502,411 B2 * 8/2013 Yamamoto .............. B60L 1/003
307/10.1
10,854,933 B2 * 12/2020 Hao ....................... B60L 3/0046
(Continued)

FOREIGN PATENT DOCUMENTS

| JP | 2011-175963 A | 9/2011 |
|---|---|---|
| JP | 2012-226895 A | 11/2012 |
| JP | 2013-081316 A | 5/2013 |

*Primary Examiner* — Hal Kaplan
*Assistant Examiner* — Swarna N Chowdhuri
(74) *Attorney, Agent, or Firm* — McGinn I.P., Law Group, PLLC.

(57) ABSTRACT

A vehicle power supply includes an electric accumulator pack, an electric motor, first and second switches, an output determiner, and a switch controller. The electric accumulator pack includes first and second electric accumulators. The first and second switches are controlled between on- and off-states. The output determiner determines whether the first electric accumulator is in a first output state or a second output state, and whether the second electric accumulator is in the first output state or the second output state. If at least one of the first electric accumulator or the second electric accumulator is in the first output state, the switch controller controls either one of the first and second switches to the on-state, and the other switch to the off-state. If both the first and second electric accumulators are in the second output state, the switch controller controls both the first and second switches to the on-state.

17 Claims, 11 Drawing Sheets

(51) Int. Cl.
  *B60L 50/60* (2019.01)
  *B60L 58/12* (2019.01)
  *H02P 27/06* (2006.01)
  *H02J 7/00* (2006.01)
  *H01M 10/46* (2006.01)
  *H01M 10/42* (2006.01)

(52) U.S. Cl.
  CPC ......... *H01M 10/425* (2013.01); *H01M 10/46* (2013.01); *H01M 10/482* (2013.01); *H01M 10/486* (2013.01); *H02J 7/0013* (2013.01); *H02J 7/0047* (2013.01); *H02P 27/06* (2013.01); *B60L 2240/36* (2013.01); *H01M 2010/4271* (2013.01); *H01M 2220/20* (2013.01)

(58) Field of Classification Search
  CPC .. H01M 10/46; H01M 10/482; H01M 10/486; H01M 2010/4271; H01M 2220/20; H02J 7/0013; H02J 7/0047; H02P 27/06
  USPC ........................................................ 307/10.1
  See application file for complete search history.

(56) References Cited

U.S. PATENT DOCUMENTS

| | | |
|---|---|---|
| 2011/0189568 A1 | 8/2011 | Minamiura et al. |
| 2014/0038009 A1 | 2/2014 | Okawa et al. |
| 2016/0315485 A1* | 10/2016 | Magagnin ................. H02J 7/35 |
| 2018/0034361 A1* | 2/2018 | Shizu ...................... H02M 1/44 |
| 2020/0343742 A1* | 10/2020 | Bacquet .............. H01M 10/425 |

* cited by examiner

VEHICLE POWER SUPPLY

CROSS-REFERENCE TO RELATED APPLICATIONS

The present application Claims priority from Japanese Patent Application No. 2020-159233 filed on Sep. 24, 2020, the entire contents of which are hereby incorporated by reference.

BACKGROUND

The disclosure relates to a vehicle power supply that is to be mounted on a vehicle.

Vehicles such as electric vehicles or hybrid vehicles are equipped with a power supply including an electric accumulator such as a battery (see Japanese Unexamined Patent Application Publication (JP-A) No. 2011-175963, JP-A No. 2012-226895, and JP-A No. 2013-81316). A traction electric motor is coupled, via an inverter or other device, to the battery incorporated into such a power supply.

SUMMARY

An aspect of the disclosure provides a vehicle power supply. The vehicle power supply is to be mounted on a vehicle, and includes an electric accumulator pack, an inverter, an electric motor, a first switch, a second switch, an output determiner, and a switch controller. The electric accumulator pack includes a first electric accumulator and a second electric accumulator. The second electric accumulator is to be coupled in parallel to the first electric accumulator. The electric motor is configured to be coupled to the electric accumulator pack via the inverter. The first switch is configured to be controlled between an on-state in which the first electric accumulator and the inverter are coupled to each other, and an off-state in which the first electric accumulator and the inverter are decoupled from each other. The second switch is configured to be controlled between an on-state in which the second electric accumulator and the inverter are coupled to each other, and an off-state in which the second electric accumulator and the inverter are decoupled from each other. The output determiner is configured to determine whether the first electric accumulator is in a first output state or the first electric accumulator is in a second output state representing a higher output state than the first output state, and determine whether the second electric accumulator is in the first output state or the second electric accumulator is in the second output state. In a case where at least one of the first electric accumulator or the second electric accumulator is in the first output state, the switch controller is configured to control either one of the first switch and the second switch to the on-state and control the other one of the first switch and the second switch to the off-state. In a case where both of the first electric accumulator and the second electric accumulator are in the second output state, the switch controller is configured to control both of the first switch and the second switch to the on-state.

An aspect of the disclosure provides a vehicle power supply. The vehicle power supply is to be mounted on a vehicle, and includes an electric accumulator pack, an inverter, an electric motor, a first switch, a second switch, and circuitry. The electric accumulator pack includes a first electric accumulator and a second electric accumulator. The second electric accumulator is to be coupled in parallel to the first electric accumulator. The electric motor is configured to be coupled to the electric accumulator pack via the inverter. The first switch is configured to be controlled between an on-state in which the first electric accumulator and the inverter are coupled to each other, and an off-state in which the first electric accumulator and the inverter are decoupled from each other. The second switch is configured to be controlled between an on-state in which the second electric accumulator and the inverter are coupled to each other, and an off-state in which the second electric accumulator and the inverter are decoupled from each other. The circuitry is configured to determine whether the first electric accumulator is in a first output state or the first electric accumulator is in a second output state representing a higher output state than the first output state, and determine whether the second electric accumulator is in the first output state or the second electric accumulator is in the second output state. In a case where at least one of the first electric accumulator or the second electric accumulator is in the first output state, the circuitry is configured to, control either one of the first switch and the second switch to the on-state and control another one of the first switch and the second switch to the off-state. In a case where both of the first electric accumulator and the second electric accumulator are in the second output state, the circuitry is configured to control both of the first switch and the second switch to the on-state.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to explain the principles of the disclosure.

DETAILED DESCRIPTION

Under low temperature environment, the output characteristics of a battery deteriorate, which may result in deteriorated power performance of a vehicle. It is desirable to improve vehicle power performance.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Vehicle Configuration

Figure 1:
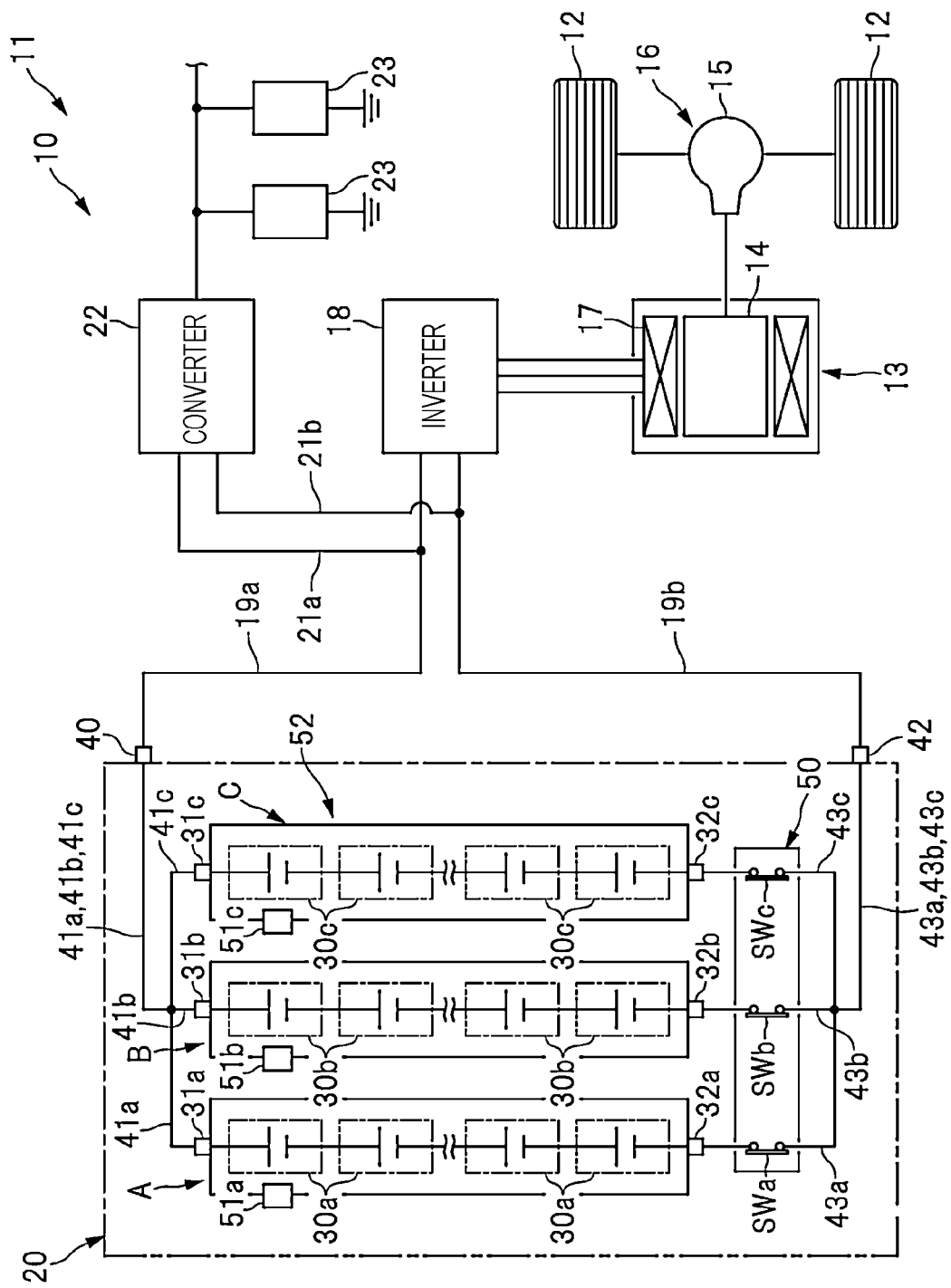
FIG. 1 schematically illustrates an exemplary configuration of a vehicle including a vehicle power supply according to an embodiment of the disclosure.

FIG. 1 schematically illustrates an exemplary configuration of a vehicle 11 including a vehicle power supply 10 according to an embodiment of the disclosure. As illustrated in FIG. 1, the vehicle 11 includes a motor generator 13 coupled to wheels 12. In one example, the motor generator 13 may serve as an "electric motor". The wheels 12 are coupled to a rotor 14 of the motor generator 13 via a drive system 16 such as a differential mechanism 15. An inverter 18, which is a power conversion device, is coupled to a stator 17 of the motor generator 13. A battery pack 20 is coupled to the inverter 18 via current-carrying cables 19a and 19b. In one example, the battery pack 20 may serve as an "electric accumulator pack". Further, a converter 22 is coupled to the battery pack 20 via current-carrying cables 21a and 21b. Electrical devices 23 such as an actuator and a controller are coupled to the converter 22.

The battery pack 20 includes three battery stacks A to C coupled in parallel to each other. The battery stacks A to C are also called battery modules. The battery stack A includes multiple battery cells 30a coupled in series to each other. The battery stack B includes multiple battery cells 30b coupled in series to each other. The battery stack C includes multiple battery cells 30c coupled in series to each other. Positive terminals 31a to 31c of the battery stacks A to C are coupled to a positive terminal 40 of the battery pack 20 respectively via positive lines 41a to 41c. Negative terminals 32a to 32c of the battery stacks A to C are coupled to a negative terminal 42 of the battery pack 20 respectively via negative lines 43a to 43c.

A switch selector 50, which includes three switches SWa to SWc, is disposed near the negative side of the battery stacks A to C. The switch SWa of the switch selector 50 is disposed in a negative line 43a of the battery stack A. In one example, the switch SWa may serve as a "first switch", and the battery stack A may serve as a "first electric accumulator". The switch SWb of the switch selector 50 is disposed in a negative line 43b of the battery stack B. In one example, the switch SWb may serve as a "second switch", and the battery stack B may serve as a "second electric accumulator". The switch SWc of the switch selector 50 is disposed in a negative line 43c of the battery stack C. The battery stacks A to C are respectively provided with battery sensors 51a to 51c. The battery sensors 51a to 51c serve to detect information about each of the battery stacks A to C, such as temperature, charge/discharge current, and terminal voltage.

By controlling the switches SWa to SWc of the switch selector 50, the coupling states of the battery stacks A to C with respect to a power circuit 52 within the battery pack 20 can be switched. That is, by controlling the switch SWa to an on-state, the battery stack A is coupled to the power circuit 52, and by controlling the switch SWa to an off-state, the battery stack A is decoupled from the power circuit 52. By controlling the switch SWb to an on-state, the battery stack B is coupled to the power circuit 52, and by controlling the switch SWb to an off-state, the battery stack B is decoupled from the power circuit 52. Further, by controlling the switch SWc to an on-state, the battery stack C is coupled to the power circuit 52, and by controlling the switch SWc to an off-state, the battery stack C is decoupled from the power circuit 52.

Control System

Figure 2:
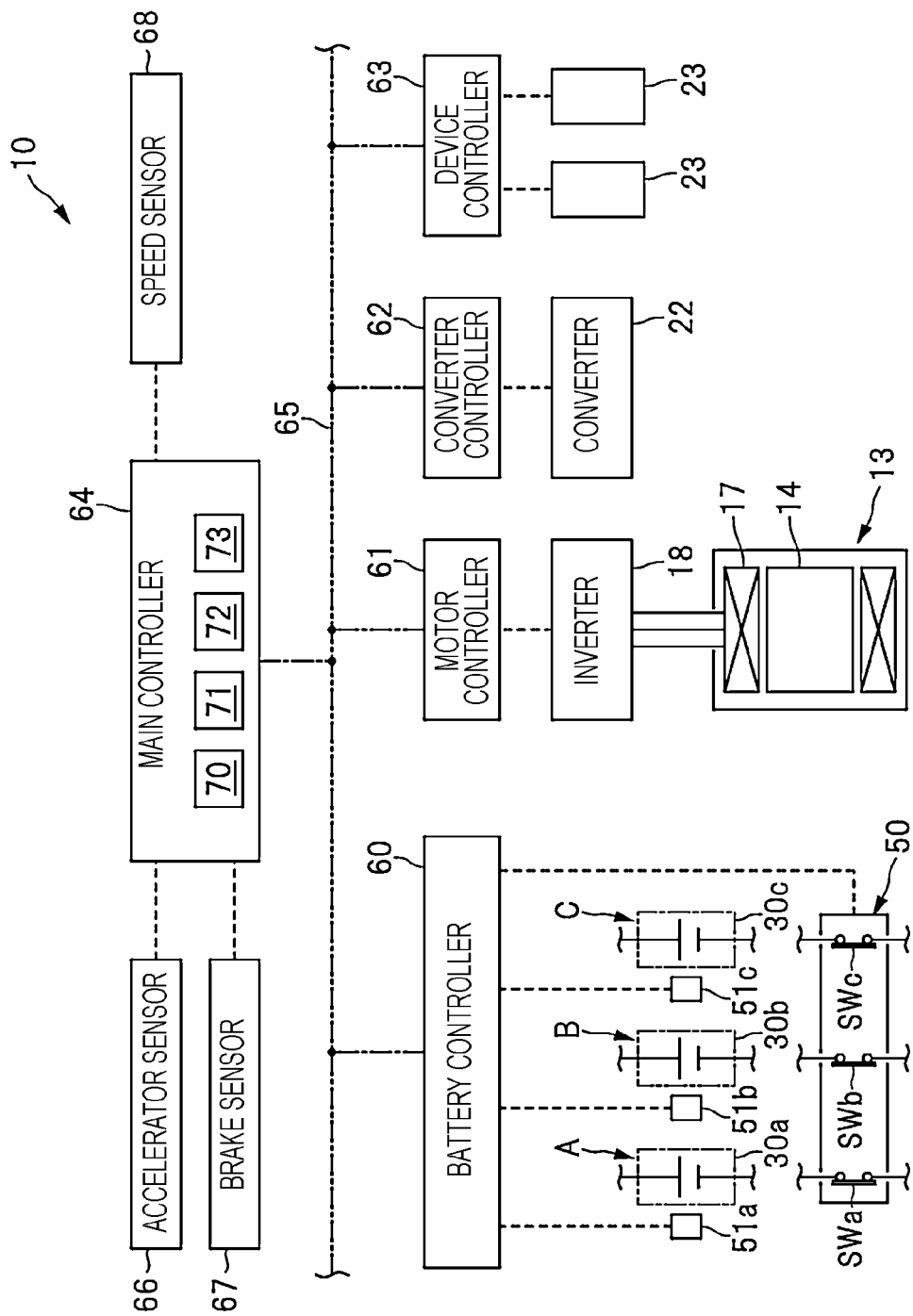
FIG. 2 schematically illustrates an exemplary control system included in the vehicle power supply.

FIG. 2 schematically illustrates an exemplary control system included in the vehicle power supply 10. As illustrated in FIG. 2, the vehicle power supply 10 includes multiple controllers 60 to 64 each implemented by, for example, a microcomputer. The controllers 60 to 64 include a battery controller 60, a motor controller 61, a converter controller 62, a device controller 63, and a main controller 64. The battery controller 60 controls the battery pack 20. The motor controller 61 controls the motor generator 13. The converter controller 62 controls the converter 22. The device controller 63 controls various electrical devices 23. The main controller 64 controls the controllers 60 to 63 in a centralized manner. The controllers 60 to 64 are coupled to each other via an onboard network 65 such as a controller area network (CAN) in a manner that allows these controllers to communicate with each other. Sensors such as an accelerator sensor 66, a brake sensor 67, and a speed sensor 68 are coupled to the main controller 64. The accelerator sensor 66 detects the operational condition of an accelerator pedal. The brake sensor 67 detects the operational condition of a brake pedal. The speed sensor 68 detects the travelling speed of the vehicle 11. The battery sensors 51a to 51c are coupled to the main controller 64 via the battery controller 60.

The main controller 64 includes an output determiner 70. The output determiner 70 determines the state of output of each of the battery stacks A to C. The output determiner 70 of the main controller 64 determines, based on information such as the temperature and SOC of each of the battery stacks A to C, whether each of the battery stacks A to C is in low output state or in normal output state. In one example, the low output state may serve as a "first output state", and the normal output state may serve as a "second output state". The normal output state is a state in which the output power is higher than in the low output state. As will be described later, when the battery stacks A to C are at low temperature, power that can be discharged from each of the battery stacks A to C decreases, and thus the battery stacks A to C are determined to be in low output state. By contrast, when the battery stacks A to C are at high temperature or at high SOC, power that can be discharged from each of the battery stacks A to C increases, and thus the battery stacks A to C are determined to be in normal output state.

A state of charge (SOC) of the battery stacks A to C is a ratio representing the amount of remaining charge stored in the battery stacks A to C, relative to the full charge capacity of the battery stacks A to C. That is, the larger the amount of charge stored in the battery stacks A to C, the higher the calculated SOC, and the smaller the amount of charge stored in the battery stacks A to C, the lower the calculated SOC. The above-mentioned SOC representing the state of charge is calculated by the battery controller 60 based on information detected by the battery sensors 51a to 51c, such as the charge/discharge current and terminal voltage of each of the battery stacks A to C.

The main controller 64 includes a switch target setting unit 71 configured to set the on/off state of the switch selector 50. The switch target setting unit 71 of the main controller 64 outputs, to the battery controller 60, a control signal responsive to the on/off state of the switch selector 50, and controls the switches SWa to SWc of the switch selector 50 via the battery controller 60. In other words, in one example, the switch target setting unit 71 and the battery controller 60 may serve as a "switch controller" configured to control the switches SWa to SWc.

Further, the main controller 64 includes a motor target setting unit 72 configured to set a target rotation speed and target torque for the motor generator 13. The motor target setting unit 72 of the main controller 64 outputs, to the motor controller 61, a control signal responsive to target torque or other information, and controls the inverter 18 via the motor controller 61. The main controller 64 includes a target electric energy calculator 73. The target electric energy calculator 73 calculates target supply electric energy TW, which represents target electric energy to be supplied to the battery pack 20. The target supply electric energy TW refers to the amount of electric energy consumed by the inverter 18 and the converter 22 over a predetermined period of time.

Operation Modes of Battery Pack

Figure 3:
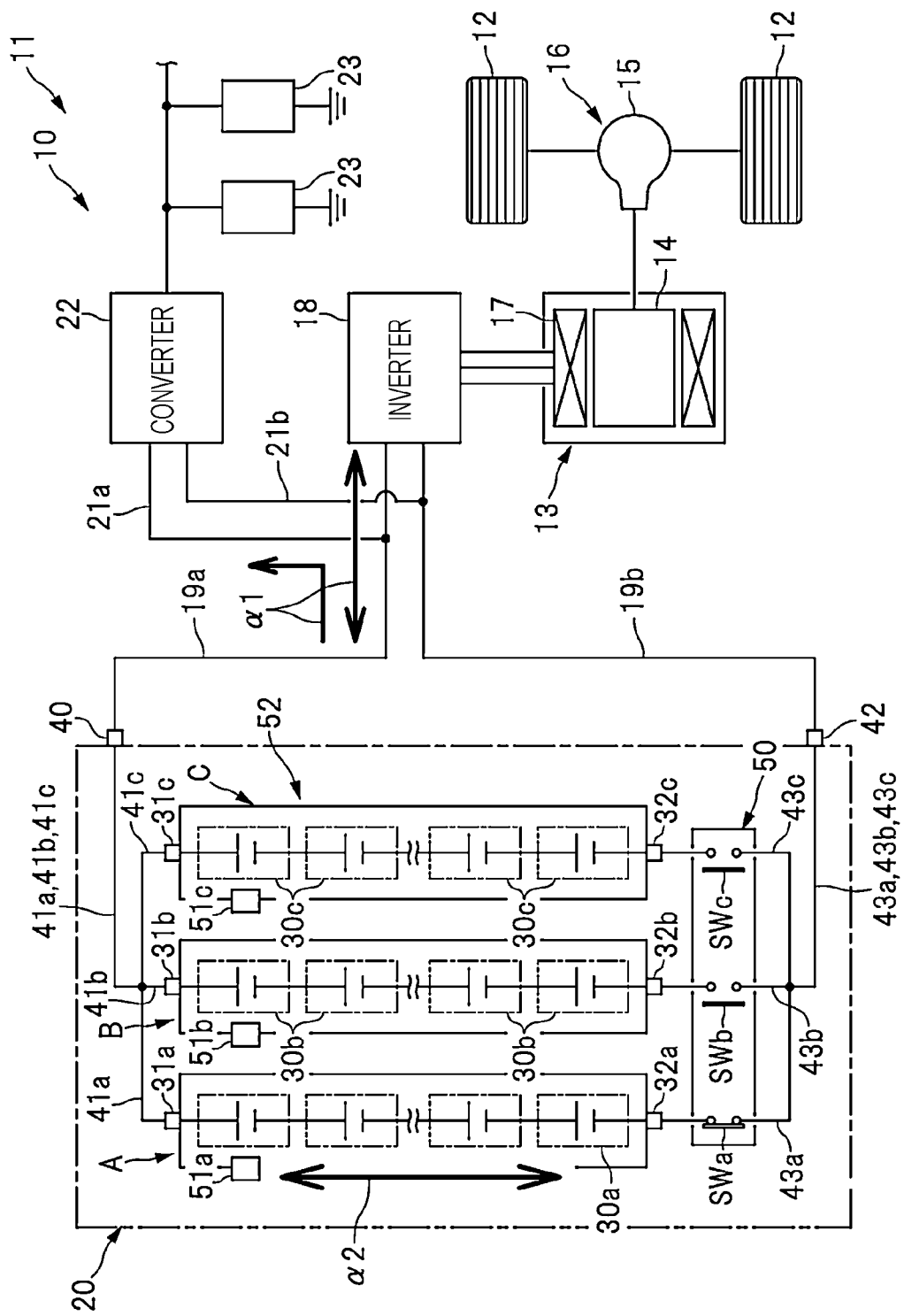
FIG. 3 illustrates execution of a series mode.
Figure 4:
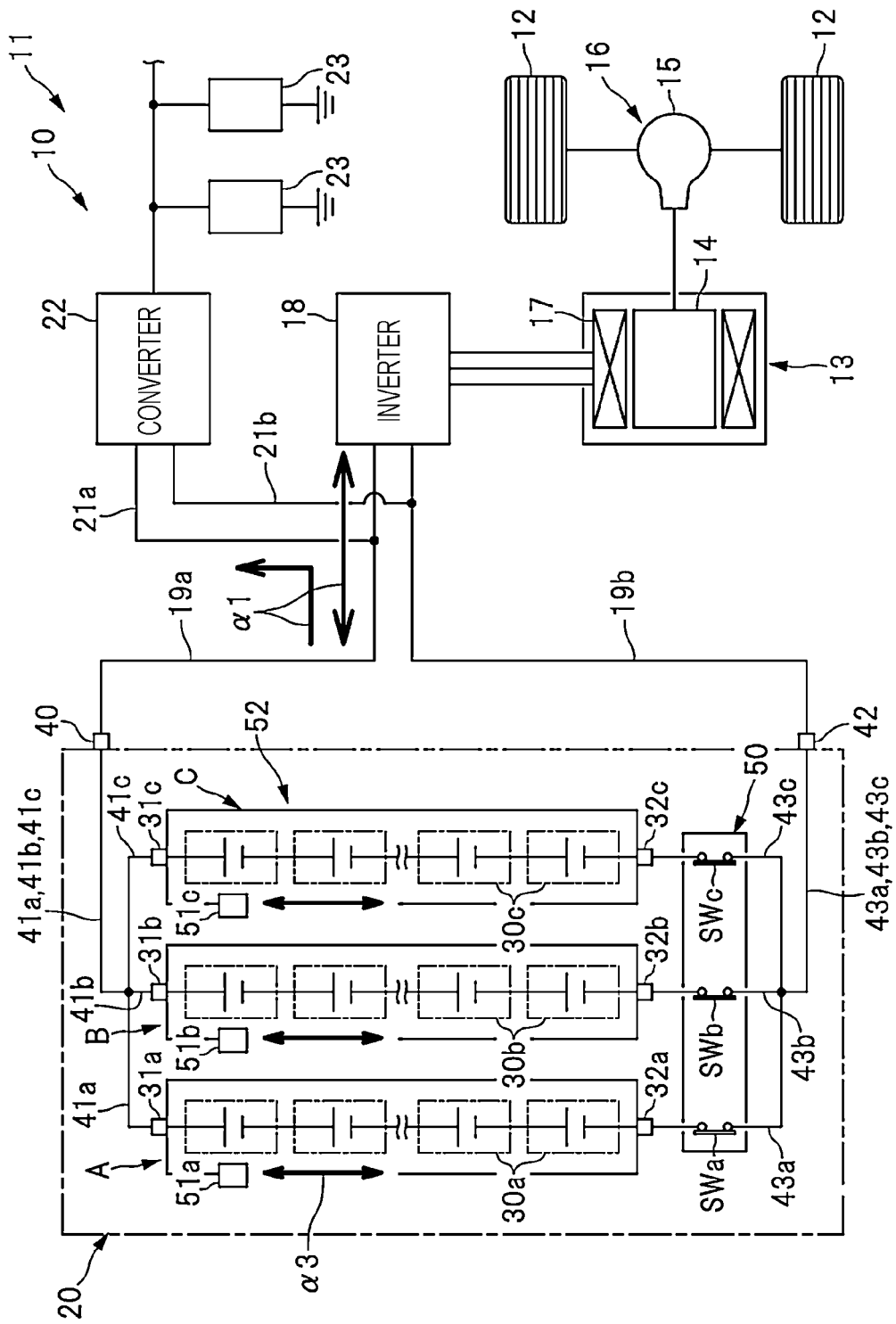
FIG. 4 illustrates execution of a parallel mode.

As described above, the battery pack 20 includes three battery stacks A to C coupled in parallel to each other. The operation modes of the battery pack 20 include a series mode and a parallel mode. In the series mode, one of the battery stacks A to C is coupled to the power circuit 52. In the parallel mode, all of the battery stacks A to C are coupled to the power circuit 52. FIG. 3 illustrates execution of the series mode. FIG. 4 illustrates execution of the parallel mode.

As illustrated in FIG. 3, in executing a series mode in which the battery stack A is to be coupled to the power circuit 52, the switch SWa is controlled to an on-state, the switch SWb is controlled to an off-state, and the switch SWc is controlled to an off-state. Thus, the battery stack A is coupled as a power source to the inverter 18 and the converter 22. In this series mode, during vehicle traction with the motor generator 13 controlled to a powering state, power is supplied from the battery stack A to the inverter 18. During vehicle deceleration with the motor generator 13 controlled to a regenerative state, power is supplied from the inverter 18 to the battery stack A. Further, depending on the operating condition of the electrical devices 23, power is supplied from the battery stack A to the converter 22.

As illustrated in FIG. 4, in executing the parallel mode in which all of the battery stacks A to C are to be coupled to the power circuit 52, all of the switches SWa to SWc are controlled to an on-state. Thus, all of the battery stacks A to C are coupled as a power source to the inverter 18 and the converter 22. In this parallel mode, during vehicle traction with the motor generator 13 controlled to a powering state, power is supplied from the battery stacks A to C to the inverter 18. During vehicle deceleration with the motor generator 13 controlled to a regenerative state, power is supplied from the inverter 18 to the battery stacks A to C. Further, depending on the operating condition of the electrical devices 23, power is supplied from the battery stacks A to C to the converter 22.

As described above, when the series mode is executed, one of the battery stacks A to C is coupled to the power circuit 52, whereas when the parallel mode is executed, all of the battery stacks A to C are coupled to the power circuit 52. Accordingly, in comparison to the parallel mode, the series mode illustrated in FIG. 3 allows for increased charge/discharge power of the battery stack A, and consequently increased charge/discharge current of the battery stack A. In other words, provided that the amount of power consumed or regenerated by the inverter 18 or the converter 22 is the same as indicated by arrows α1 in FIGS. 3 and 4, the charge/discharge power α2 of the battery stack A in the series mode can be made greater than the charge/discharge power α3 of the battery stack A in the parallel mode. As described above, the series mode allows the load on a selected one of the battery stacks A to C to be increased, whereas the parallel mode allows the load on each of the battery stacks A to C to be set substantially uniform.

In executing the series mode in which the battery stack B is to be coupled to the power circuit 52 to increase the load on the battery stack B, the switch SWa is controlled to an off-state, the switch SWb is controlled to an on-state, and the switch SWc is controlled to an off-state. In executing the series mode in which the battery stack C is to be coupled to the power circuit 52 to increase the load on the battery stack C, the switch SWa is controlled to an off-state, the switch SWb is controlled to an off-state, and the switch SWc is controlled to an on-state.

Battery Warm-Up Control and Flowchart

Electric Energy Calculation Control

Figure 5:
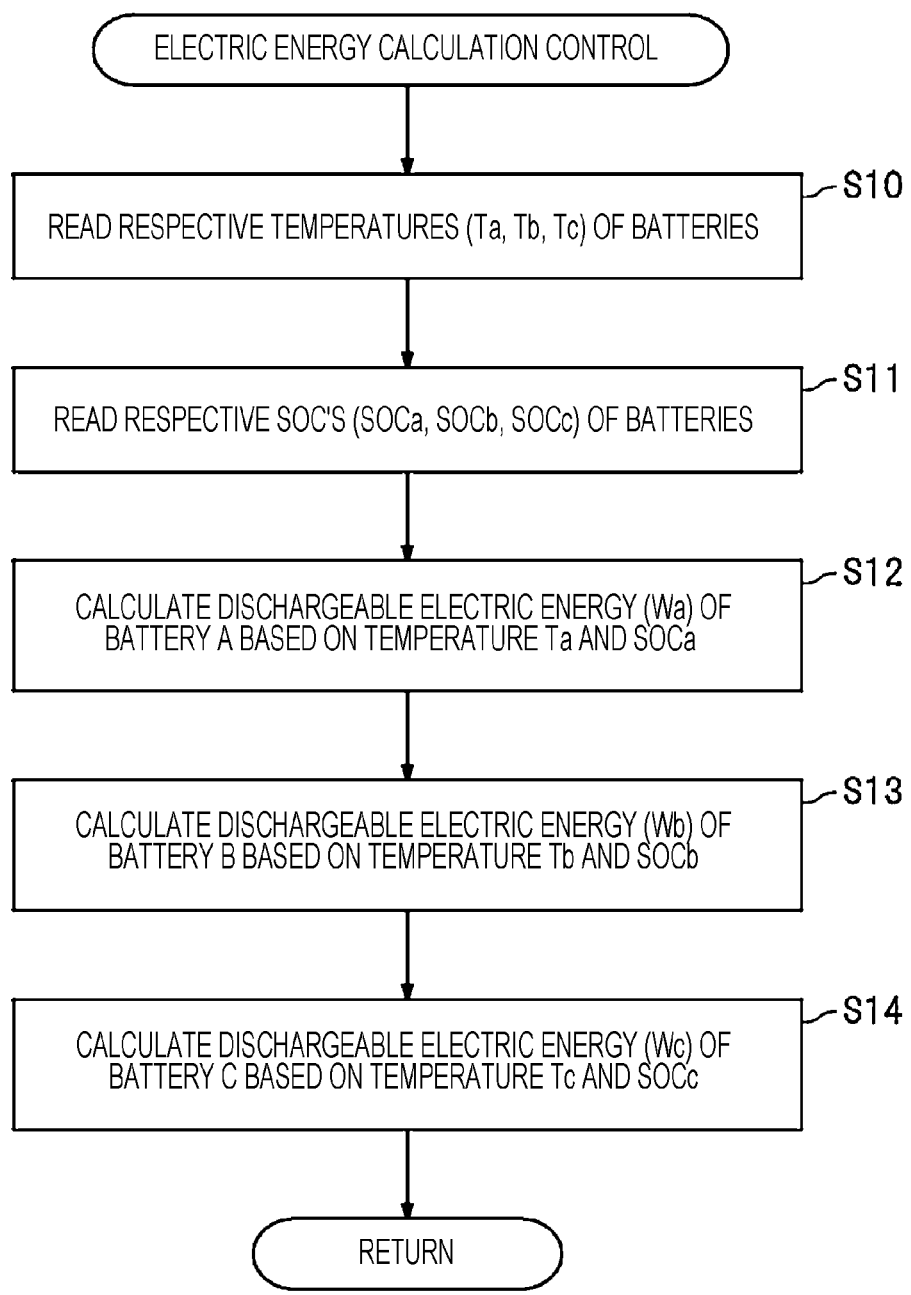
FIG. 5 is a flowchart illustrating an exemplary procedure for executing an electric energy calculation control.

Reference is now made first to a control for calculating the electric energy of each of the battery stacks A to C (to be referred to as "electric energy calculation control" hereinafter), and then to a control for warming up the battery pack 20 early under low temperature environment (to be referred to as "battery warm-up control" hereinafter). FIG. 5 is a flowchart illustrating an exemplary procedure for executing an electric energy calculation control. FIGS. 6 to 10 are flowcharts illustrating an exemplary procedure for executing a battery warm-up control. The flowcharts in FIGS. 6 to 10 are connected with each other at locations indicated by reference signs A to E. The electric energy calculation control in FIG. 5 is executed every predetermined period of time, and the battery warm-up control in FIGS. 6 to 10 is executed every predetermined period of time. In FIGS. 5 to 9, the battery stacks A to C are indicated simply as "batteries A to C" for brevity.

As illustrated in FIG. 5, at step S10, the respective temperatures Ta, Tb, and Tc of the battery stacks A to C are read, and at step S11, SOCa, SOCb, and SOCc, which represent the respective SOCs of the battery stacks A to C, are read. Subsequently, at step S12, based on the temperature Ta and SOCa of the battery stack A and by reference to predetermined map data, the amount of electric energy that can be discharged from the battery stack A (to be referred to as "dischargeable electric energy Wa of the battery stack A" hereinafter) is calculated. At step S13, based on the temperature Tb and SOCb of the battery stack B and by reference to the predetermined map data, the amount of electric energy that can be discharged from the battery stack B (to be referred to as "dischargeable electric energy Wb of the battery stack B" hereinafter) is calculated. Further, at step S14, based on the temperature Tc and SOCc of the battery stack C and by reference to the predetermined map data, the amount of electric energy that can be discharged from the battery stack C (to be referred to as "dischargeable electric energy Wc of the battery stack C" hereinafter) is calculated.

In this regard, the respective dischargeable electric energies Wa to Wc of the battery stacks A to C refer to the amounts of electrical energy that can be discharged from the battery stacks A to C over a predetermined period of time. As the temperatures Ta to Tc of the battery stacks A to C decrease, the battery stacks A to C increase in internal resistance and consequently decrease in current, resulting in the dischargeable electric energies Wa to Wc being set to smaller values. As the SOCa to SOCc of the battery stacks A to C decrease, the terminal voltages of the battery stacks A to C decrease, resulting in the dischargeable electric energies Wa to Wc being set to smaller values. In other words, with respect to the predetermined map data to which reference is made during the electric energy calculation control, the dischargeable electric energies Wa to Wc are set to decrease with decreasing temperatures Ta to Tc, and set to decrease with decreasing SOCa to SOCb.

Battery Warm-Up Control

Figure 6:
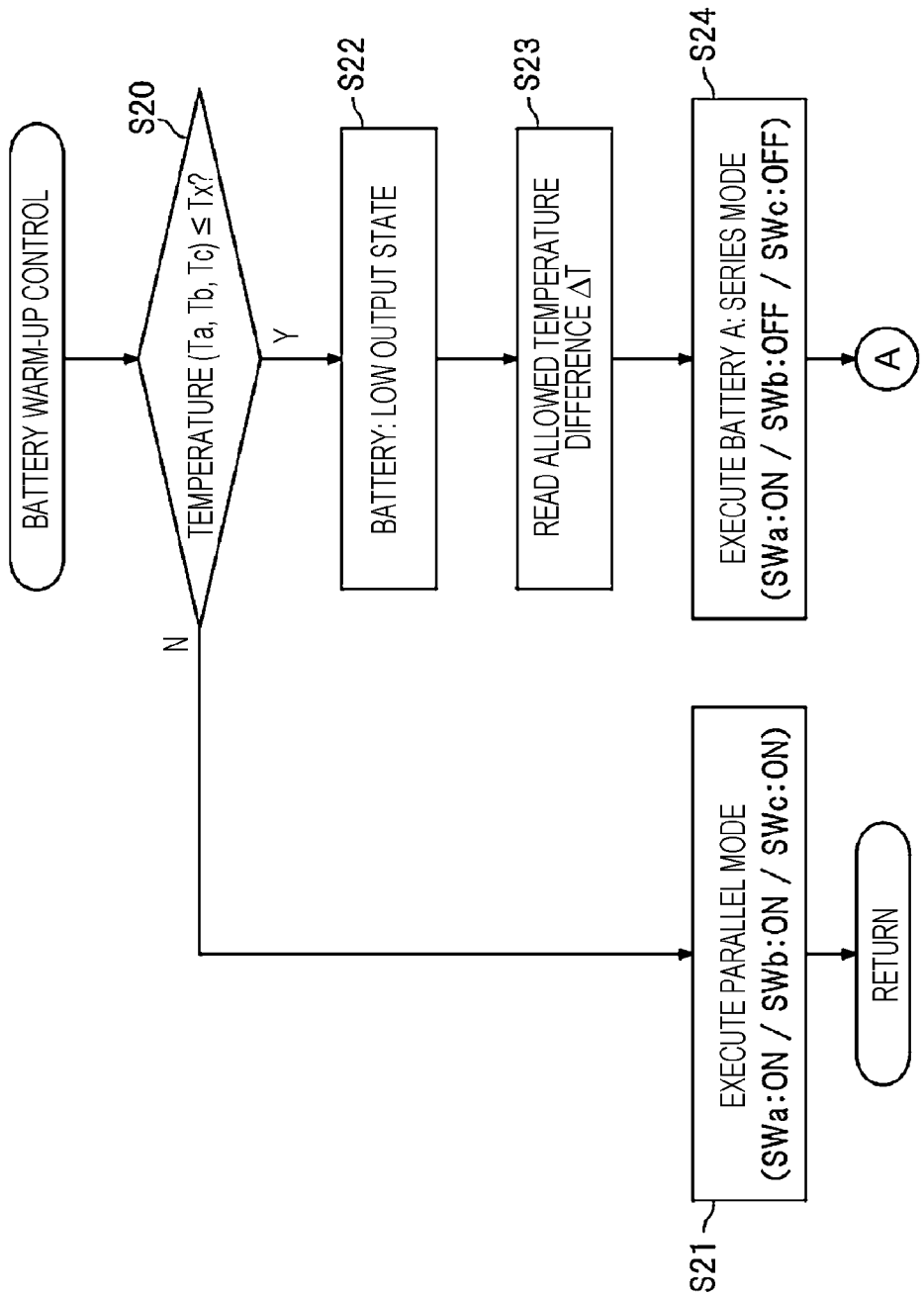
FIG. 6 is a flowchart illustrating an exemplary procedure for executing a battery warm-up control.

Reference is now made to the battery warm-up control. As illustrated in FIG. 6, it is determined at step S20 whether at least one of the temperature Ta of the battery stack A, the temperature Tb of the battery stack B, or the temperature Tc of the battery stack C is less than or equal to a predetermined temperature threshold Tx. If it is determined at step S20 that all of the temperatures Ta to Tc are above the predetermined temperature threshold Tx, the control proceeds to step S21. At step S21, the parallel mode is selected as an operation mode, the switches SWa to SWc of the switch selector 50 are all controlled to an on-state, and the routine is exited. In other words, if it is determined that the battery stacks A to C are at appropriate temperature, and that the battery stacks A to C are thus not in low output state, the parallel mode is selected as an operation mode.

Series Mode A

If it is determined at step S20 mentioned above that at least one of the temperature Ta, the temperature Tb, or the temperature Tc is less than or equal to the predetermined temperature threshold Tx, the control proceeds to step S22, where at least one of the battery stack A, the battery stack B, or the battery stack C is determined to be in low output state. If one or more or all of the battery stacks A to C are thus determined to be in low output state, the control proceeds to step S23, where an allowed temperature difference ΔT (e.g., several degrees Celsius), which represents an allowed temperature difference among the battery stacks A to C, is read. The control then proceeds to step S24, where a series mode targeted at the battery stack A (to be referred to as "series mode A" hereinafter) is executed as the operation mode. In the series mode A, the switch SWa of the switch selector 50 is controlled to an on-state, and the switches SWb and SWc are controlled to an off-state. Executing the series mode A in this way makes it possible to increase the load on the battery stack A as illustrated in FIG. 3, and consequently raise the temperature Ta of the battery stack A early.

Figure 7:
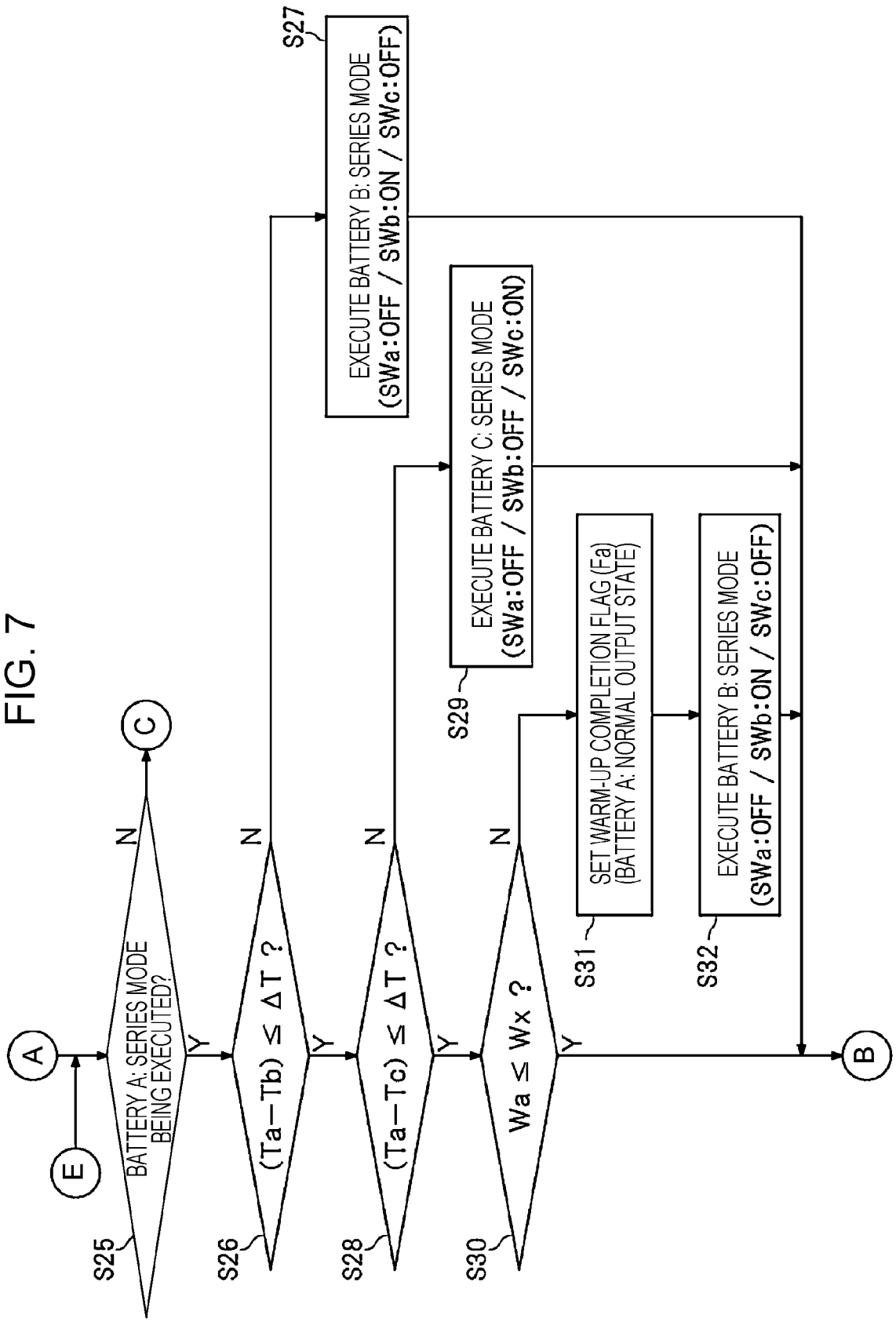
FIG. 7 is a flowchart illustrating an exemplary procedure for executing a battery warm-up control.

Subsequently, as illustrated in FIG. 7, it is determined at step S25 whether the series mode A is being executed. If it is determined at step S25 that the series mode A is being executed, the control proceeds to step S26, where it is determined whether the temperature difference (Ta–Tb) between the battery stacks A and B is less than or equal to the allowed temperature difference ΔT. If it is determined at step S26 that the temperature difference (Ta–Tb) is above the allowed temperature difference ΔT, in other words, if it is determined at step S26 that the temperature Ta of the battery stack A has risen relative to the battery stack B to such an extent that their temperature difference exceeds a predetermined temperature difference, the control proceeds to step S27, where a series mode targeted at the battery stack B (to be referred to as "series mode B" hereinafter) is executed. In the series mode B, the switch SWb of the switch selector 50 is controlled to an on-state, and the switches SWa and SWc are controlled to an off-state. Executing the series mode B in this way makes it possible to increase the load on the battery stack B, and consequently raise the temperature Tb of the battery stack B early.

If it is determined at step S26 mentioned above that the temperature difference (Ta–Tb) is less than or equal to the allowed temperature difference ΔT, the control proceeds to step S28, where it is determined whether the temperature difference (Ta–Tc) between the battery stacks A and C is less than or equal to the allowed temperature difference ΔT. If it is determined at step S28 that the temperature difference (Ta–Tc) is above the allowed temperature difference ΔT, in other words, if it is determined at step S28 that the temperature Ta of the battery stack A has risen relative to the battery stack C to such an extent that their temperature difference exceeds a predetermined temperature difference, the control proceeds to step S29, where a series mode targeted at the battery stack C (to be referred to as "series mode C" hereinafter) is executed. In the series mode C, the switch SWc of the switch selector 50 is controlled to an on-state, and the switches SWa and SWb are controlled to an off-state. Executing the series mode C in this way makes it possible to increase the load on the battery stack C, and consequently raise the temperature Tc of the battery stack C early.

If it is determined at step S28 mentioned above that the temperature difference (Ta–Tc) is less than or equal to the allowed temperature difference ΔT, the control proceeds to step S30, where it is determined whether the dischargeable electric energy Wa of the battery stack A is less than or equal to a predetermined threshold Wx. A case where the dischargeable electric energy Wa is determined to be above the threshold Wx at step S30 is when, due to the execution of the series mode A, the temperature Ta of the battery stack A has risen sufficiently and thus the battery stack A has reached its normal output state. Accordingly, in such a case, the control proceeds to step S31, where a warm-up completion flag Fa indicative of the completion of the series mode A is set. The control then proceeds to step S32, where the series mode B for warming up the battery stack B is executed.

As described above, the series mode A for warming up the battery stack A is continued until the temperature Ta of the battery stack A rises to a point where the dischargeable electric energy Wa of the battery stack A is above the threshold Wx. Even during the execution of the series mode A, if the temperature difference (Ta–Tb) exceeds the allowed temperature difference ΔT, then the series mode A is interrupted and the series mode B is executed, whereas if the temperature difference (Ta–Tc) exceeds the allowed temperature difference ΔT, then the series mode A is interrupted and the series mode C is executed. In other words, in situations where the temperature difference among the battery stacks A to C increases excessively, the series mode A is interrupted and the series mode B or the series mode C is executed to warm up the battery stack B or C that is at relatively low temperature.

Series Mode B

Figure 8:
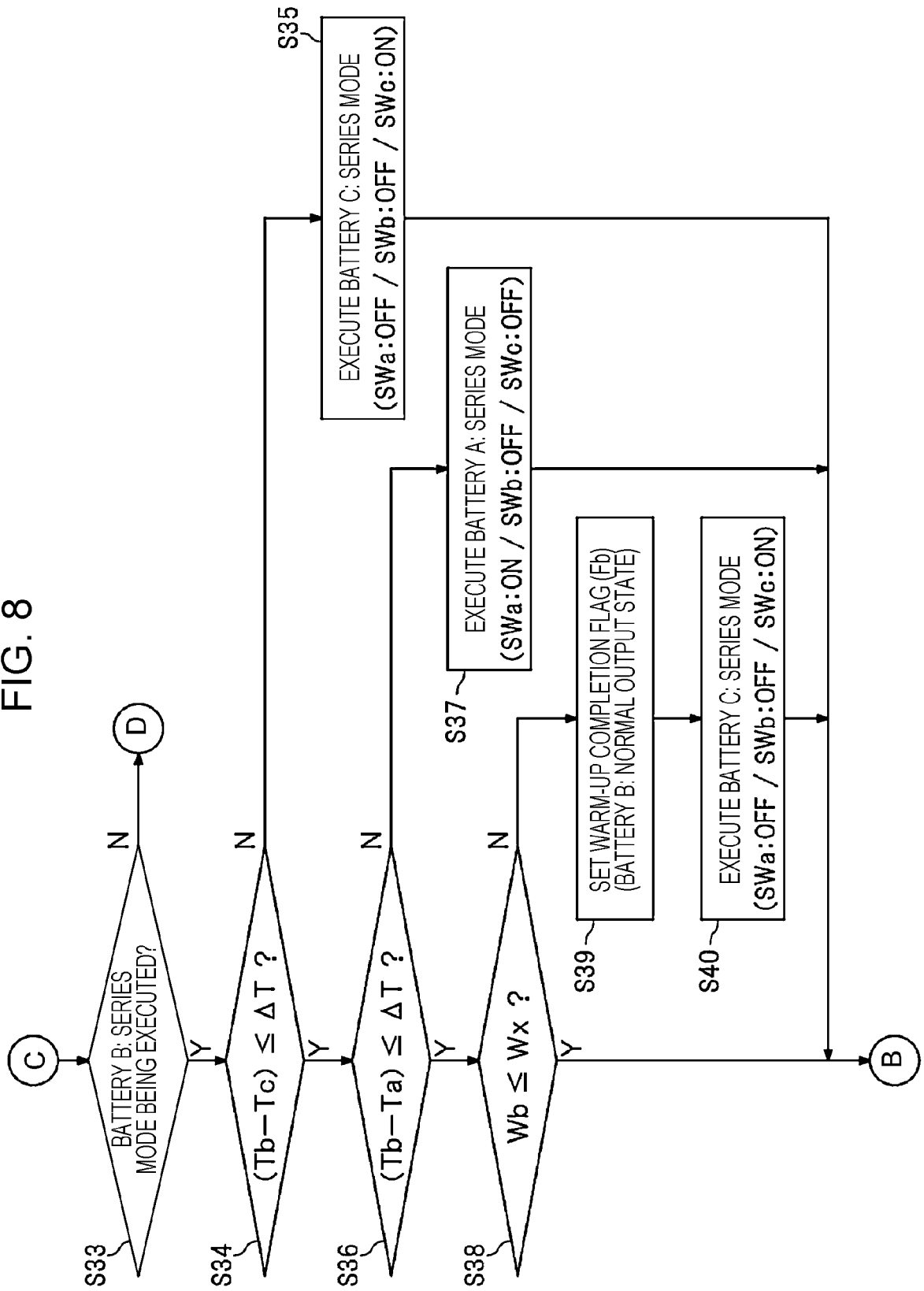
FIG. 8 is a flowchart illustrating an exemplary procedure for executing a battery warm-up control.

As illustrated in FIG. 7, if it is determined at step S25 that the series mode A is not being executed, then as illustrated in FIG. 8, the control proceeds to step S33, where it is determined whether the series mode B is being executed. If it is determined at step S33 that the series mode B is being executed, in other words, if the temperature Tb of the battery stack B is being actively raised, the control proceeds to step S34, where it is determined whether the temperature difference (Tb–Tc) between the battery stacks B and C is less than or equal to the allowed temperature difference ΔT. If it is determined at step S34 that the temperature difference (Tb–Tc) is above the allowed temperature difference ΔT, in other words, if it is determined at step S34 that the temperature Tb of the battery stack B has risen relative to the battery stack C to such an extent that their temperature difference exceeds a predetermined temperature difference, the control proceeds to step S35, where the series mode C is executed. Executing the series mode C in this way makes it possible to increase the load on the battery stack C, and consequently raise the temperature Tc of the battery stack C early.

If it is determined at step S34 mentioned above that the temperature difference (Tb−Tc) is less than or equal to the allowed temperature difference ΔT, the control proceeds to step S36, where it is determined whether the temperature difference (Tb−Ta) between the battery stacks B and A is less than or equal to the allowed temperature difference ΔT. If it is determined at step S36 that the temperature difference (Tb−Ta) is above the allowed temperature difference ΔT, in other words, if it is determined at step S36 that the temperature Tb of the battery stack B has risen relative to the battery stack A to such an extent that their temperature difference exceeds a predetermined temperature difference, the control proceeds to step S37, where the series mode A is executed. Executing the series mode A in this way makes it possible to increase the load on the battery stack A, and consequently raise the temperature Ta of the battery stack A early.

If it is determined at step S36 mentioned above that the temperature difference (Tb−Ta) is less than or equal to the allowed temperature difference ΔT, the control proceeds to step S38, where it is determined whether the dischargeable electric energy Wb of the battery stack B is less than or equal to the predetermined threshold Wx. A case where the dischargeable electric energy Wb is determined to be above the threshold Wx at step S38 is when, due to the execution of the series mode B, the temperature Tb of the battery stack B has risen sufficiently and thus the battery stack B has reached its normal output state. Accordingly, in such a case, the control proceeds to step S39, where a warm-up completion flag Fb indicative of the completion of the series mode B is set. The control then proceeds to step S40, where the series mode C for warming up the battery stack C is executed.

As described above, the series mode B for warming up the battery stack B is continued until the temperature Tb of the battery stack B rises to a point where the dischargeable electric energy Wb of the battery stack B is above the threshold Wx. Even during the execution of the series mode B, if the temperature difference (Tb−Tc) exceeds the allowed temperature difference ΔT, the series mode B is interrupted and the series mode C is executed, whereas if the temperature difference (Tb−Ta) exceeds the allowed temperature difference ΔT, the series mode B is interrupted and the series mode A is executed. In other words, in situations where the temperature difference among the battery stacks A to C increases excessively, the series mode B is interrupted and the series mode A or the series mode C is executed to warm up the battery stack A or C that is at relatively low temperature.

Series Mode C

Figure 9:
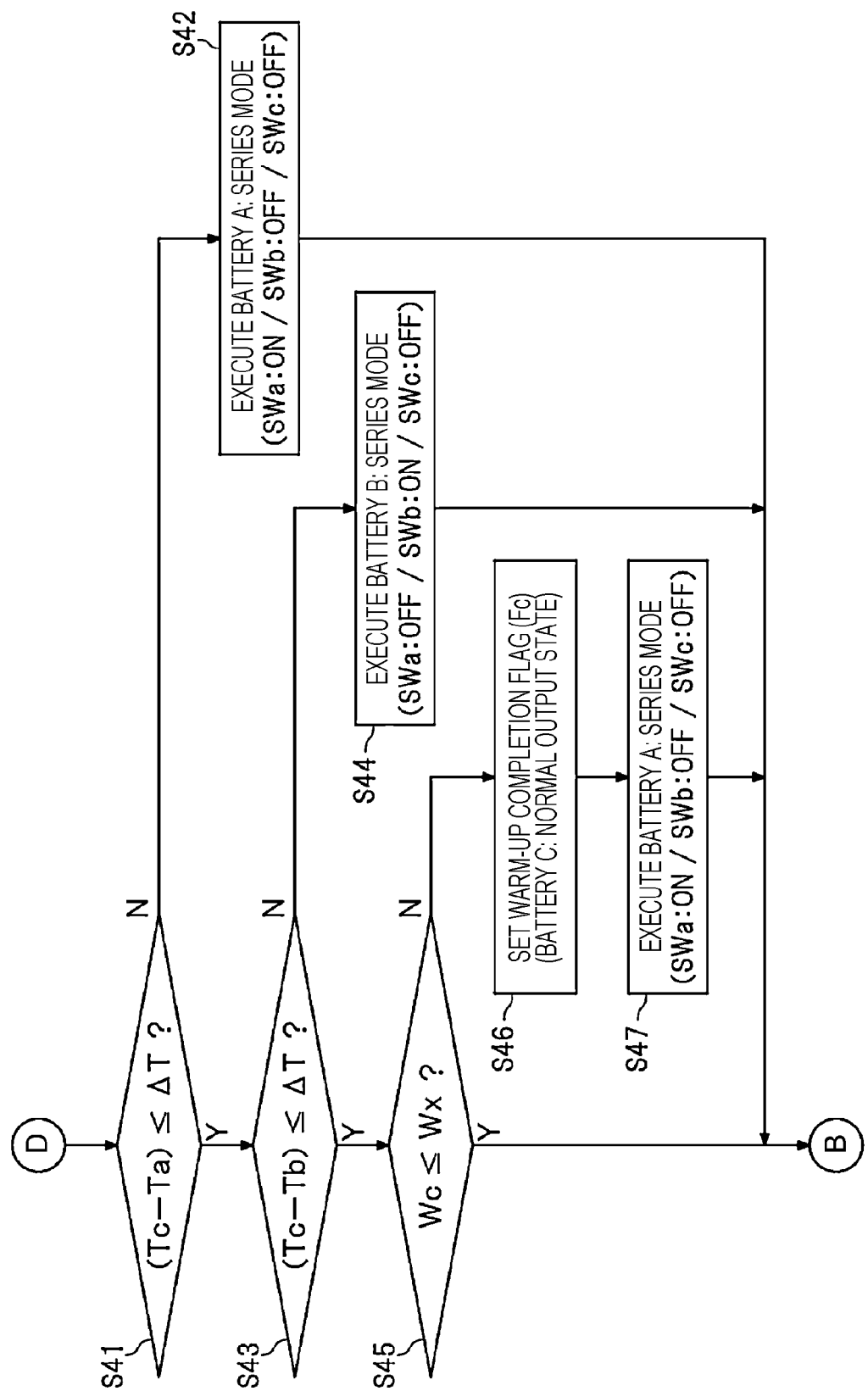
FIG. 9 is a flowchart illustrating an exemplary procedure for executing a battery warm-up control.

If, as illustrated in FIG. 8, it is determined at step S33 that the series mode B is not being executed, in other words, if the temperature Tc of the battery stack C is being actively raised through execution of the series mode C, then as illustrated in FIG. 9, the control proceeds to step S41, where it is determined whether the temperature difference (Tc−Ta) between the battery stacks C and A is less than or equal to the allowed temperature difference ΔT. If it is determined at step S41 that the temperature difference (Tc−Ta) is above the allowed temperature difference ΔT, in other words, if it is determined at step S41 that the temperature Tc of the battery stack C has risen relative to the battery stack A to such an extent that their temperature difference exceeds a predetermined temperature difference, the control proceeds to step S42, where the series mode A is executed. Executing the series mode A in this way makes it possible to increase the load on the battery stack A, and consequently raise the temperature Ta of the battery stack A early.

If it is determined at step S41 mentioned above that the temperature difference (Tc−Ta) is less than or equal to the allowed temperature difference ΔT, the control proceeds to step S43, where it is determined whether the temperature difference (Tc−Tb) between the battery stacks C and B is less than or equal to the allowed temperature difference ΔT. If it is determined at step S43 that the temperature difference (Tc−Tb) is above the allowed temperature difference ΔT, in other words, if it is determined at step S43 that the temperature Tc of the battery stack C has risen relative to the battery stack B to such an extent that their temperature difference exceeds a predetermined temperature difference, the control proceeds to step S44, where the series mode B is executed. Executing the series mode B in this way makes it possible to increase the load on the battery stack B, and consequently raise the temperature Tb of the battery stack B early.

If it is determined at step S43 mentioned above that the temperature difference (Tc−Tb) is less than or equal to the allowed temperature difference ΔT, the control proceeds to step S45, where it is determined whether the dischargeable electric energy Wc of the battery stack C is less than or equal to the predetermined threshold Wx. A case where the dischargeable electric energy Wc is determined to be above the threshold Wx at step S45 is when, due to the execution of the series mode C, the temperature Tc of the battery stack C has risen sufficiently and thus the battery stack C has reached its normal output state. Accordingly, in such a case, the control proceeds to step S46, where a warm-up completion flag Fc indicative of the completion of the series mode C is set. The control then proceeds to step S47, where the series mode A for warming up the battery stack A is executed.

As described above, the series mode C for warming up the battery stack C is continued until the temperature Tc of the battery stack C rises to a point where the dischargeable electric energy Wc of the battery stack C is above the threshold Wx. Even during the execution of the series mode C, if the temperature difference (Tc−Ta) exceeds the allowed temperature difference ΔT, the series mode C is interrupted and the series mode A is executed, whereas if the temperature difference (Tc−Tb) exceeds the allowed temperature difference ΔT, the series mode C is interrupted and the series mode B is executed. In other words, in situations where the temperature difference among the battery stacks A to C increases excessively, the series mode C is interrupted and the series mode A or the series mode B is executed to warm up the battery stack A or B that is at relatively low temperature.

Temporary Energization Mode

As described above, when the series mode A, B, or C is executed, one of the battery stacks A to C is coupled to the power circuit 52. Thus, power shortage may occur depending on the operating condition of the motor generator 13, the electrical devices 23, or other devices. To address this, if there is a risk of power shortage, a temporary energization mode is executed in which one or more of the battery stacks A to C being currently decoupled are temporarily coupled to the power circuit 52. Reference is now made to a procedure for executing the temporary energization mode.

Figure 10:
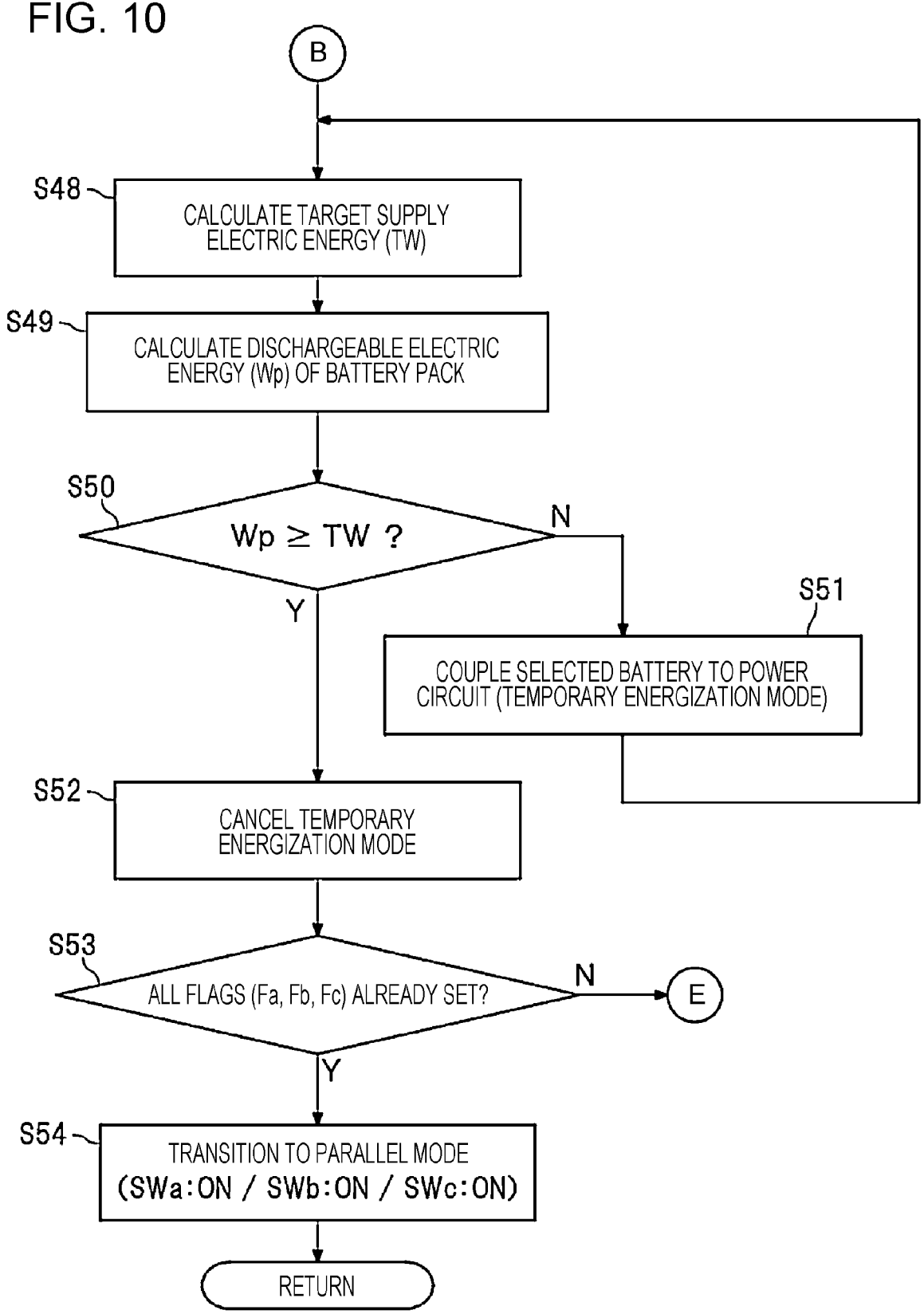
FIG. 10 is a flowchart illustrating an exemplary procedure for executing a battery warm-up control.

As illustrated in FIG. 10, during execution of each of the series modes A to C, the control proceeds to step S48, where the target supply electric energy TW to be supplied to the battery pack 20 is calculated. As described above, the target supply electric energy TW refers to the amount of electric energy consumed by the inverter 18 and the converter 22 over a predetermined period of time. The target supply electric energy TW is calculated based on the operating condition of the motor generator 13, the electrical devices 23, or other devices. Subsequently, at step S49, the amount of electric energy that can be discharged from the battery pack 20 (to be referred to as "dischargeable electric energy Wp" hereinafter) is calculated. The dischargeable electric energy Wp is given as the sum of the respective dischargeable electric energies of one or more of the battery stacks A to C that are to be coupled to the power circuit 52 of the battery pack 20. For example, if the series mode A is executed, an amount of electric energy equal to the dischargeable electric energy Wa is calculated as the dischargeable electric energy Wp, whereas if the battery stack B is temporarily coupled to the power circuit 52 while the series mode A is executed, then the sum of the dischargeable electric energies Wa and Wb is calculated as the dischargeable electric energy Wp.

Subsequently, at step S50, it is determined whether the dischargeable electric energy Wp of the battery pack 20 is greater than or equal to the target supply electric energy TW for the battery pack 20. If it is determined at step S50 that the dischargeable electric energy Wp is below the target supply electric energy TW, this means that the dischargeable electric energy Wp is not sufficient. Accordingly, the control proceeds to step S51 to execute a temporary energization mode in which a selected one of the battery stacks A to C is coupled to the power circuit 52. As a result, the dischargeable electric energy Wp can be increased to enable supply of sufficient power from the battery pack 20 to the inverter 18 or the converter 22.

For example, if the dischargeable electric energy Wp is below the target supply electric energy TW while the series mode A is executed, a temporary energization mode is executed in which the battery stack B or the battery stack C is coupled to the power circuit 52. In this temporary energization mode, it is desirable to select either one of the battery stacks B and C that has the smaller integrated value of charge/discharge current, in other words, the less degraded battery stack, and couple the selected battery stack to the power circuit 52. Coupling the less degraded battery stack to the power circuit 52 in this way helps to reduce variations in degradation among the battery stacks A to C. In the temporary energization mode mentioned above, either one of the battery stacks B and C with a lower temperature than the other may be selected and coupled to the power circuit 52. In this case, the battery stack with a lower temperature can be warmed up, which allows the battery pack 20 to be warmed up early.

If it is determined at step S50 that the dischargeable electric energy Wp is greater than or equal to the target supply electric energy TW, the control proceeds to step S52, where the temporary energization mode is cancelled, and the immediately previous series mode A, B, or C is continued. Subsequently, it is determined at step S53 whether all of the warm-up completion flags Fa to Fc have been set. If it is determined at step S53 that not all of the warm-up completion flags Fa to Fc have been set, this means that a battery stack in low output state exists. Accordingly, the control returns to step S25 in FIG. 7, where a series mode targeted at the battery stack in low output state is continued.

Parallel Mode

If it is determined at step S53 mentioned above that all of the warm-up completion flags Fa to Fc have been set, in other words, if it is determined at step S53 that all of the battery stacks A to C are in normal output state, the control proceeds to step S54 where, for transition from the series mode to the parallel mode, all of the switches SWa to SWc are controlled to an on-state, and the routine is exited. As described above, if all of the battery stacks A to C have reached their normal output state due to the completion of the series modes A to C, then the parallel mode is executed in which the battery stacks A to C are coupled in parallel to each other. As a result, the load on each of the battery stacks A to C can be lowered, which helps to reduce degradation of the battery stacks A to C.

Battery Warm-Up Control and Timing Chart

Figure 11:
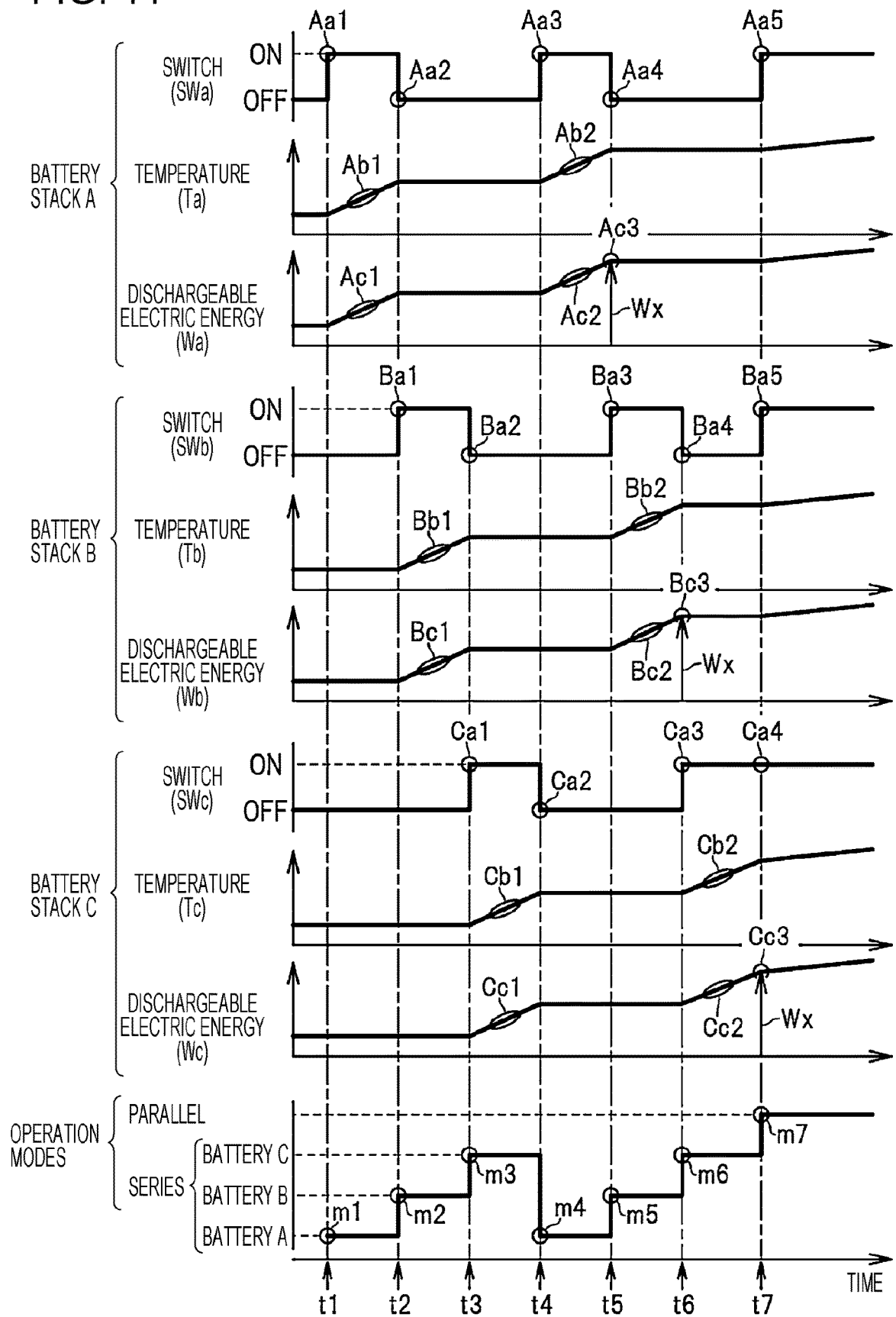
FIG. 11 is a timing chart illustrating exemplary execution of a battery warm-up control.

The battery warm-up control mentioned above is described below with reference to a timing chart. FIG. 11 is a timing chart illustrating exemplary execution of the battery warm-up control. The flowchart in FIG. 11 illustrates a situation where, after the vehicle 11 is started under low temperature environment, the battery stacks A to C are warmed up through execution of the series modes A to C, before the control transitions to the parallel mode.

As indicated at time t1 in FIG. 11, upon starting the vehicle 11 under low temperature environment, the switch SWa is controlled to an on-state (reference sign Aa1), and the series mode A is executed (reference sign m1). When the series mode A is executed in this way, the temperature Ta of the battery stack A rises (reference sign Ab1), and also the dischargeable electric energy Wa of the battery stack A increases (reference sign Ac1).

At time t2, the temperature Ta of the battery stack A has risen relative to the temperature Tb of the battery stack B to such an extent that their difference exceeds the allowed temperature difference ΔT (not illustrated). Accordingly, the switch SWa is controlled to an off-state (reference sign Aa2), and the switch SWb is controlled to an on-state (reference sign Ba1). When the series mode A is thus switched to the series mode B (reference sign m2), the temperature Tb of the battery stack B rises (reference sign Bb1), and also the dischargeable electric energy Wb of the battery stack B increases (reference sign Bc1).

At time t3, the temperature Tb of the battery stack B has risen relative to the temperature Tc of the battery stack C to such an extent that their difference exceeds the allowed temperature difference ΔT. Accordingly, the switch SWb is controlled to an off-state (reference sign Ba2), and the switch SWc is controlled to an on-state (reference sign Ca1). When the series mode B is thus switched to the series mode C (reference sign m3), the temperature Tc of the battery stack C rises (reference sign Cb1), and also the dischargeable electric energy Wc of the battery stack C increases (reference sign Cc1).

At time t4, the temperature Tc of the battery stack C has risen relative to the temperature Ta of the battery stack A to such an extent that their difference exceeds the allowed temperature difference ΔT. Accordingly, the switch SWc is controlled to an off-state (reference sign Ca2), and the switch SWa is controlled to an on-state (reference sign Aa3). When the series mode C is thus switched to the series mode A (reference sign m4), the temperature Ta of the battery stack A rises again (reference sign Ab2), and also the dischargeable electric energy Wa of the battery stack A increases again (reference sign Ac2).

At time t5, the dischargeable electric energy Wa of the battery stack A reaches the threshold Wx (reference sign Ac3). Thus, the switch SWa is controlled to an off-state (reference sign Aa4), and the switch SWb is controlled to an on-state (reference sign Ba3). When the series mode A is thus completed and the series mode B is resumed (reference sign m5), the temperature Tb of the battery stack B rises again (reference sign Bb2), and also the dischargeable electric energy Wb of the battery stack B increases again (reference sign Bc2).

At time t6, the dischargeable electric energy Wb of the battery stack B reaches the threshold Wx (reference sign Bc3). Thus, the switch SWb is controlled to an off-state (reference sign Ba4), and the switch SWc is controlled to an on-state (reference sign Ca3). When the series mode B is thus completed and the series mode C is resumed (reference sign m6), the temperature Tc of the battery stack C rises again (reference sign Cb2), and also the dischargeable electric energy Wc of the battery stack C increases again (reference sign Cc2).

At time t7, the dischargeable electric energy Wc of the battery stack C reaches the threshold Wx (reference sign Cc3). Thus, all of the switches SWa to SWc are controlled to an on-state (reference sign Aa5, Ba5, Ca4). In this way, upon completion of the series modes A to C, the parallel mode is executed in which all of the battery stacks A to C are coupled in parallel to each other (reference sign m7).

CONCLUSION

With the vehicle power supply 10 according to the embodiment, the series modes A to C are executed to increase the load on each of the battery stacks A to C, and to promote the generation of heat by each of the battery stacks A to C. As a result, the battery stacks A to C can be warmed up for improved output characteristics, and the charge/discharge efficiency of each of the battery stacks A to C can be improved. The ability to improve the charge/discharge efficiency of each of the battery stacks A to C allows for improved power performance and energy efficiency of the vehicle 11. Further, the battery stacks A to C can be warmed up without use of an electric heater. The energy efficiency of the vehicle 11 can be improved also in this respect.

For example, as described above with reference to the flowchart in FIGS. 5 to 10, if it is determined based on the temperatures Ta to Tc of the battery stacks A to C that at least one of the battery stack A, the battery stack B, or the battery stack C is in low output state, the series mode A, B, or C for coupling the at least one battery stack A, B, or C to the power circuit 52 is executed. As a result, the load on the at least one battery stack A, B, or C coupled to the power circuit 52 can be increased, which allows the at least one battery stack A, B, or C to be warmed up early. Further, whether each of the battery stacks A to C is in low output state is determined based on the temperatures Ta to Tc of the battery stacks A to C as described above. As a result, the low output state of each of the battery stacks A to C can be determined effectively. This allows the series modes A to C to be executed in an appropriate manner.

If it is determined based on the respective temperatures Ta to Tc and SOCs of the battery stacks A to C that all of the battery stacks A to C are in normal output state, the parallel mode is executed in which all of the battery stacks A to C are coupled to the power circuit 52. As a result, the load on each of the battery stacks A to C can be lowered, which helps to reduce degradation of the battery stacks A to C. Further, whether each of the battery stacks A to C is in normal output state is determined based on the respective temperatures Ta to Tc and SOCs of the battery stacks A to C as described above. The normal output state of each of the battery stacks A to C can be thus determined effectively. In this regard, if the battery stacks A to C are at decreased SOC, the power performance of the vehicle 11 may deteriorate due to power shortage. Such deterioration of power performance can be reduced.

Reference is now made by way of example to operation of the battery stack A, operation of the battery stack B, operation of the switch SWa, and operation of the switch SWb. In one example, the battery stack A may serve as a "first electric accumulator", the battery stack B may serve as a "second electric accumulator", the switch SWa may serve as a "first switch", and the switch SWb may serve as a "second switch".

For example, if the battery stack A is in low output state, and the battery stack B is in normal output state, the series mode A is executed. In the series mode A, the switch SWa is controlled to an on-state, the switch SWb is controlled to an off-state, and the battery stack A is to be charged or discharged. By executing the series mode A, the load on the battery stack A can be increased to thereby increase the temperature Ta, which allows the battery stack A to change from the low output state to the normal output state.

If the battery stack B is in low output state, and the battery stack A is in normal output state, the series mode B is executed. In the series mode B, the switch SWb is controlled to an on-state, the switch SWa is controlled to an off-state, and the battery stack B is to be charged or discharged. By executing the series mode B, the load on the battery stack B can be increased to thereby increase the temperature Tb, which allows the battery stack B to change from the low output state to the normal output state.

If both the battery stacks A and B are in low output state, the series mode A or the series mode B is executed depending on the situation.

For example, if, under a situation where the series mode A is executed, the temperature difference (Ta−Tb) between the battery stacks A and B is above the allowed temperature difference $\Delta T$, in other words, if the temperature Ta of the battery stack A has risen relative to the battery stack B to such an extent that their difference exceeds a predetermined temperature difference, the series mode A is switched to the series mode B. In other words, if, under a situation where both the battery stacks A and B are in low output state, the battery stack B is at a lower temperature than the battery stack A, then the switch SWb is controlled to an on-state, the switch SWa is controlled to an off-state, and thus the series mode A is switched to the series mode B. As a result, the temperature difference (Ta−Tb) between the battery stacks A and B can be reduced, which helps to reduce variations in output characteristics between the battery stacks A and B.

Likewise, if, under a situation where the series mode B is executed, the temperature difference (Tb−Ta) between the battery stacks B and A is above the allowed temperature difference $\Delta T$, in other words, if the temperature Tb of the battery stack B has risen relative to the battery stack A to such an extent that their difference exceeds a predetermined temperature difference, the series mode B is switched to the series mode A. In other words, if, under a situation where both the battery stacks A and B are in low output state, the battery stack A is at a lower temperature than the battery stack B, then the switch SWa is controlled to an on-state, the switch SWb is controlled to an off-state, and thus the series mode B is switched to the series mode A. As a result, the temperature difference (Tb−Ta) between the battery stacks B and A can be reduced, which helps to reduce variations in output characteristics between the battery stacks B and A.

As described above, if at least one of the battery stack A or the battery stack B is in low output state, either one of the battery stacks A and B is controlled to an on-state, and the other one of the battery stacks A and B is controlled to an off-state. Thus, either one of the series modes A and B is executed. If both the battery stack A and the battery stack B are in normal output state, both the switch SWa and the switch SWb are controlled to an on-state. Thus, the parallel mode is executed.

It is to be readily appreciated that the disclosure is not limited to the embodiment mentioned above, but capable of various modifications without departing from the scope of the disclosure. Although an electric vehicle including the motor generator 13 as a motive power source is described above as an example of the vehicle 11 to which the vehicle power supply 10 is applied, this is not intended to be limiting. The vehicle 11 may be a hybrid vehicle including, as a motive power source, a motor generator and an engine.

In the foregoing description, whether each of the battery stacks A to C is in low output state is determined based on their respective temperatures Ta to Tc. However, this is not intended to be limiting. For example, the dischargeable electric energies Wa to Wc each calculated based on temperature and SOC may be used in determining whether each of the battery stacks A to C is in low output state. In this case, the battery stacks A to C may be determined to be in low output state if their respective dischargeable electric energies Wa to Wc are below a predetermined threshold.

In the foregoing description, the dischargeable electric energies Wa to Wc each calculated based on temperature and SOC are used in determining whether the battery stacks A to C are in normal output state. However, this is not intended to be limiting. For example, the battery stacks A to C may be determined to be in normal output state if the respective temperatures Ta to Tc of the battery stacks A to C are above a predetermined temperature. In the foregoing description, the dischargeable electric energies Wa to Wc each representing the amount of electric energy that can be discharged over a predetermined period of time are used. However, this is not intended to be limiting. Dischargeable powers representing the dischargeable electric energies Wa to Wc per unit time may be used.

In the foregoing description, the battery pack 20 is made up of three battery stacks A to C. However, this is not intended to be limiting. The battery pack 20 may be made up of two battery stacks, or may be made up of four or more battery stacks. Although it is possible to employ lithium-ion batteries as the battery cells 30a to 30c. However, this is not intended to be limiting. Other types of batteries, or capacitors may be employed.

In the foregoing description, the switch selector 50 is disposed near the negative side of the battery stacks A to C. However, this is not intended to be limiting. The switch selector 50 may be disposed near the positive side of the battery stacks A to C, or the switch selector 50 may be disposed near both the negative and positive sides of the battery stacks A to C. Each of the switches SWa to SWc constituting the switch selector 50 may be a switch implemented by a semiconductor device such as a MOSFET, or may be a switch with a contact that is mechanically opened/ closed by use of, for example, electromagnetic force. The switches SWa to SWc are also called relays or contactors.

According to an embodiment of the disclosure, the switch controller is configured to, if at least one of the first electric accumulator or the second electric accumulator is in the first output state, control either one of the first switch and the second switch to an on-state, and control the other one of the first switch and the second switch to an off-state. As a result, the load on the first electric accumulator or the second electric accumulator can be increased, which helps to promote the generation of heat by the first electric accumulator or the second electric accumulator to thereby improve vehicle power performance.

The controllers illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the controllers including the battery controller 60, the motor controller 61, the converter controller 62, the device controller 63, and the main controller 64. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. A vehicle power supply to be mounted on a vehicle, the vehicle power supply comprising:
an electric accumulator pack comprising a first electric accumulator and a second electric accumulator to be coupled in parallel to the first electric accumulator;
an inverter;
an electric motor configured to be coupled to the electric accumulator pack via the inverter;
a first switch configured to be controlled between
an on-state in which the first electric accumulator and the inverter are coupled to each other, and
an off-state in which the first electric accumulator and the inverter are decoupled from each other;
a second switch configured to be controlled between
an on-state in which the second electric accumulator and the inverter are coupled to each other, and
an off-state in which the second electric accumulator and the inverter are decoupled from each other;
an output determiner configured to determine whether the first electric accumulator is in a first output state or the first electric accumulator is in a second output state representing a higher output state than the first output state, and determine whether the second electric accumulator is in the first output state or the second electric accumulator is in the second output state; and
a switch controller configured to,
in a case where at least one of the first electric accumulator or the second electric accumulator is in the first output state, control either one of the first switch and the second switch to the on-state, and control the other one of the first switch and the second switch to the off-state, and
in a case where both of the first electric accumulator and the second electric accumulator are in the second output state, control both of the first switch and the second switch to the on-state.

2. The vehicle power supply according to claim 1, wherein the switch controller is configured to,
in a case where the first electric accumulator is in the first output state and the second electric accumulator is in the second output state, control the first switch to the on-state, and control the second switch to the off-state, and in a case where the second electric accumulator is in the first output state and the first electric accumulator is in the second output state, control the second switch to the on-state, and control the first switch to the off-state.

3. The vehicle power supply according to claim 1, wherein the switch controller is configured to, in a case where, under a condition in which both of the first electric accumulator and the second electric accumulator are in the first output state, a first temperature of the first electric accumulator is lower than a second temperature of the second electric accumulator, control the first switch to the on-state, and control the second switch to the off-state, and in a case where, under the condition in which both of the first electric accumulator and the second electric accumulator are in the first output state, the second temperature is lower than the first temperature, control the second switch to the on-state, and control the first switch to the off-state.

4. The vehicle power supply according to claim 2, wherein the switch controller is configured to, in a case where, under a condition in which both of the first electric accumulator and the second electric accumulator are in the first output state, a first temperature of the first electric accumulator is lower than a second temperature of the second electric accumulator, control the first switch to the on-state, and control the second switch to the off-state, and in a case where, under the condition in which both of the first electric accumulator and the second electric accumulator are in the first output state, the second temperature is lower than the first temperature, control the second switch to the on-state, and control the first switch to the off-state.

5. The vehicle power supply according to claim 1, wherein the output determiner is configured to, based on a first temperature of the first electric accumulator, determine whether the first electric accumulator is in the first output state, and based on a second temperature of the second electric accumulator, determine whether the second electric accumulator is in the first output state.

6. The vehicle power supply according to claim 2, wherein the output determiner is configured to, based on a first temperature of the first electric accumulator, determine whether the first electric accumulator is in the first output state, and based on a second temperature of the second electric accumulator, determine whether the second electric accumulator is in the first output state.

7. The vehicle power supply according to claim 3, wherein the output determiner is configured to, based on the first temperature, determine whether the first electric accumulator is in the first output state, and based on the second temperature, determine whether the second electric accumulator is in the first output state.

8. The vehicle power supply according to claim 4, wherein the output determiner is configured to, based on the first temperature, determine whether the first electric accumulator is in the first output state, and based on the second temperature, determine whether the second electric accumulator is in the first output state.

9. The vehicle power supply according to claim 1, wherein the output determiner is configured to, based on a first temperature and a state of charge of the first electric accumulator, determine whether the first electric accumulator is in the second output state, and based on a second temperature and a state of charge of the second electric accumulator, determine whether the second electric accumulator is in the second output state.

10. The vehicle power supply according to claim 2, wherein the output determiner is configured to, based on a first temperature and a state of charge of the first electric accumulator, determine whether the first electric accumulator is in the second output state, and based on a second temperature and a state of charge of the second electric accumulator, determine whether the second electric accumulator is in the second output state.

11. The vehicle power supply according to claim 3, wherein the output determiner is configured to, based on the first temperature and a state of charge of the first electric accumulator, determine whether the first electric accumulator is in the second output state, and based on the second temperature and a state of charge of the second electric accumulator, determine whether the second electric accumulator is in the second output state.

12. The vehicle power supply according to claim 4, wherein the output determiner is configured to, based on the first temperature and a state of charge of the first electric accumulator, determine whether the first electric accumulator is in the second output state, and based on the second temperature and a state of charge of the second electric accumulator, determine whether the second electric accumulator is in the second output state.

13. The vehicle power supply according to claim 5, wherein the output determiner is configured to, based on the first temperature and a state of charge of the first electric accumulator, determine whether the first electric accumulator is in the second output state, and based on the second temperature and a state of charge of the second electric accumulator, determine whether the second electric accumulator is in the second output state.

14. The vehicle power supply according to claim 6, wherein the output determiner is configured to, based on the first temperature and a state of charge of the first electric accumulator, determine whether the first electric accumulator is in the second output state, and based on the second temperature and a state of charge of the second electric accumulator, determine whether the second electric accumulator is in the second output state.

15. The vehicle power supply according to claim 7, wherein the output determiner is configured to, based on the first temperature and a state of charge of the first electric accumulator, determine whether the first electric accumulator is in the second output state, and based on the second temperature and a state of charge of the second electric accumulator, determine whether the second electric accumulator is in the second output state.

16. The vehicle power supply according to claim 8, wherein the output determiner is configured to, based on the first temperature and a state of charge of the first electric accumulator, determine whether the first electric accumulator is in the second output state, and based on the second temperature and a state of charge of the second electric accumulator, determine whether the second electric accumulator is in the second output state.

17. A vehicle power supply to be mounted on a vehicle, the vehicle power supply comprising:

an electric accumulator pack comprising a first electric accumulator and a second electric accumulator to be coupled in parallel to the first electric accumulator;

an inverter;

an electric motor configured to be coupled to the electric accumulator pack via the inverter;

a first switch configured to be controlled between an on-state in which the first electric accumulator and the inverter are coupled to each other, and an off-state in which the first electric accumulator and the inverter are decoupled from each other;

a second switch configured to be controlled between an on-state in which the second electric accumulator and the inverter are coupled to each other, and an off-state in which the second electric accumulator and the inverter are decoupled from each other; and circuitry configured to determine whether the first electric accumulator is in a first output state or the first electric accumulator is in a second output state representing a higher output state than the first output state, and determine whether the second electric accumulator is in the first output state or the second electric accumulator is in the second output state, in a case where at least one of the first electric accumulator or the second electric accumulator is in the first output state, control either one of the first switch and the second switch to the on-state, and control the other one of the first switch and the second switch to the off-state, and in a case where both of the first electric accumulator and the second electric accumulator are in the second output state, control both of the first switch and the second switch to the on-state.

* * * * *